(12) United States Patent
Ahmed et al.

(10) Patent No.: US 11,227,270 B2
(45) Date of Patent: Jan. 18, 2022

(54) ONE TAP/COMMAND GROCERY ORDERING VIA SELF-DRIVING MINI MARTS AND SEAMLESS CHECKOUT-FREE TECHNOLOGY

(71) Applicant: Robomart, Inc., San Francisco, CA (US)

(72) Inventors: Syed Ali Ahmed, Islamabad (PK); Emad Suhail Rahim, Sachse, TX (US); Tigran Shahverdyan, Yerevan (AM)

(73) Assignee: ROBOMART, INC., Santa Monica, CA (US)

( * ) Notice: Subject to any disclaimer, the term of this patent is extended or adjusted under 35 U.S.C. 154(b) by 289 days.

(21) Appl. No.: 15/993,318

(22) Filed: May 30, 2018

(65) Prior Publication Data
US 2018/0349872 A1 Dec. 6, 2018

Related U.S. Application Data

(60) Provisional application No. 62/512,387, filed on May 30, 2017.

(51) Int. Cl.
| | |
|---|---|
| *G06Q 20/18* | (2012.01) |
| *G06Q 20/20* | (2012.01) |
| *G06Q 10/08* | (2012.01) |
| *G06Q 20/14* | (2012.01) |
| *G07G 1/00* | (2006.01) |
| *G06Q 20/08* | (2012.01) |

(52) U.S. Cl.
CPC ......... *G06Q 20/18* (2013.01); *G06Q 10/0833* (2013.01); *G06Q 20/0855* (2013.01); *G06Q 20/14* (2013.01); *G06Q 20/20* (2013.01); *G06Q 20/201* (2013.01); *G06Q 20/203* (2013.01); *G07G 1/0036* (2013.01)

(58) Field of Classification Search
CPC .... G06Q 20/18; G06Q 10/0833; G06Q 20/14; H04W 4/40
USPC ............ 705/20, 26.8, 13, 27.1; 701/412, 36; 340/995.1
See application file for complete search history.

(56) References Cited

U.S. PATENT DOCUMENTS

| | | | |
|---|---|---|---|
| 2009/0187488 A1* | 7/2009 | Shamilian ............ | G06Q 20/045 705/16 |
| 2013/0232029 A1* | 9/2013 | Rovik .................... | G07C 5/008 705/26.8 |
| 2015/0006005 A1* | 1/2015 | Yu .......................... | G06Q 50/28 701/22 |

(Continued)

*Primary Examiner* — Vanel Frenel
(74) *Attorney, Agent, or Firm* — Arluys IP, P.C.

(57) ABSTRACT

The present disclosure generally relates to an application for obtaining groceries or other merchandise and, more particularly, a one tap/command grocery ordering via self-driving mini marts and seamless checkout-free technology. The method is implemented in a computer infrastructure having computer executable code tangibly embodied on a computer readable storage medium having programming instructions and is operable to: deploy an autonomous vehicle which carries consumer merchandise to a consumer; determine which merchandise has been taken from the autonomous vehicle by the consumer; calculate a cost for the merchandise taken from the autonomous vehicle by the consumer; and provide a receipt to the consumer for the merchandise taken from the autonomous vehicle by the consumer.

20 Claims, 10 Drawing Sheets

(56) References Cited

U.S. PATENT DOCUMENTS

| | | | |
|---|---|---|---|
| 2015/0356665 A1* | 12/2015 | Colson | G06Q 30/0635 705/26.81 |
| 2016/0098670 A1* | 4/2016 | Oz | G06Q 10/083 705/27.1 |
| 2016/0203651 A1* | 7/2016 | Heath | H04W 4/40 705/13 |
| 2017/0146361 A1* | 5/2017 | Lucas | G01C 21/3682 |
| 2017/0261977 A1* | 9/2017 | High | B64D 1/22 |
| 2017/0313421 A1* | 11/2017 | Gil | B64D 45/04 |
| 2018/0024554 A1* | 1/2018 | Brady | G06Q 10/0837 701/23 |
| 2018/0174093 A1* | 6/2018 | Perez | G06Q 10/08355 |
| 2019/0049988 A1* | 2/2019 | Meij | G05D 1/0274 |
| 2019/0347614 A1* | 11/2019 | Khasis | G01C 21/3415 |
| 2020/0184437 A1* | 6/2020 | Kelly | G07F 9/001 |

\* cited by examiner

ONE TAP/COMMAND GROCERY ORDERING VIA SELF-DRIVING MINI MARTS AND SEAMLESS CHECKOUT-FREE TECHNOLOGY

TECHNICAL FIELD

The present invention generally relates to an application for obtaining groceries or other merchandise and, more particularly, a one tap/command grocery ordering via self-driving mini marts and seamless checkout-free technology.

BACKGROUND

Amazon™ created a checkout free physical store, but the issue is this is still a store you have to go to. Also with Amazon™ Go™ it is not possible to easily track people. It is also time consuming to shop for groceries currently on your mobile telephone and navigate through multiple menus to put together a basket. Additionally on-demand delivery is expensive and not that accessible. And, importantly, many shoppers want to physically see the products and groceries before buying, but with home delivery this is not possible.

Currently on demand delivery systems are very costly, with an addition of more than several dollars per order just devoted to delivery costs. With such costs, single on-demand delivery companies are struggling to make profits on orders. Additionally, customers when ordering groceries would infrequently order fresh produce, despite the fact that fresh produce is the largest grocery category in terms of sales contribution globally. It is surmised that people just do not trust someone else picking their produce for them, and they cannot pick produce themselves with home delivery. The consumer simply must go the grocery store to pick their own products so that they can touch, feel and see their fresh groceries before buying. Many categories, such as produce, meats, dairy, bakery goods, and which make up the majority (60%+) of all grocery sales are highly visceral and people need to pick these products themselves, without relying on someone else's judgment no matter how trained or careful they may be in selecting the produce.

SUMMARY

In an aspect of the invention, a method implemented in a computer infrastructure having computer executable code tangibly embodied on a computer readable storage medium having programming instructions is operable to: deploy an autonomous vehicle which carries consumer merchandise to a consumer; determine which merchandise has been taken from the autonomous vehicle by the consumer; calculate a cost for the merchandise taken from the autonomous vehicle by the consumer; and provide a receipt to the consumer for the merchandise taken from the autonomous vehicle by the consumer.

In another of the invention, a computer program product for autonomously providing merchandise to a user is provided. The computer program product comprises a computer readable storage medium having program instructions embodied therewith. The program instructions are executable by a computing device to cause the computing device to: determine a location of a user: determine a nearest autonomous mobile store (autonomous vehicle) to the location of the consumer; deploy the nearest autonomous vehicle to the location of the consumer; determine which merchandise has been taken from the autonomous vehicle by the consumer; calculate a cost for the merchandise taken from the autonomous vehicle by the consumer; and provide a receipt to the consumer for the merchandise taken from the autonomous vehicle by the consumer.

In a further aspect of the invention, a system comprises: a CPU, a computer readable memory and a computer readable storage medium; program instructions to determine a location of a user: program instructions to determine a nearest autonomous vehicle to the location of the consumer; program instructions to deploy the nearest autonomous vehicle to the location of the consumer; program instructions to determine which merchandise has been taken from the autonomous vehicle by the consumer; program instructions to calculate a cost for the merchandise taken from the autonomous vehicle by the consumer; and program instructions to provide a receipt to the consumer for the merchandise taken from the autonomous vehicle by the consumer. The program instructions are stored on the computer readable storage medium for execution by the CPU via the computer readable memory.

In another aspect of the invention, a method is provided for deploying a system for performing the functions described herein in a computing environment. The method comprises providing a computer infrastructure being operable to perform any combination of the method steps and/or any combination of functionality of the computing environment disclosed and/or recited herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
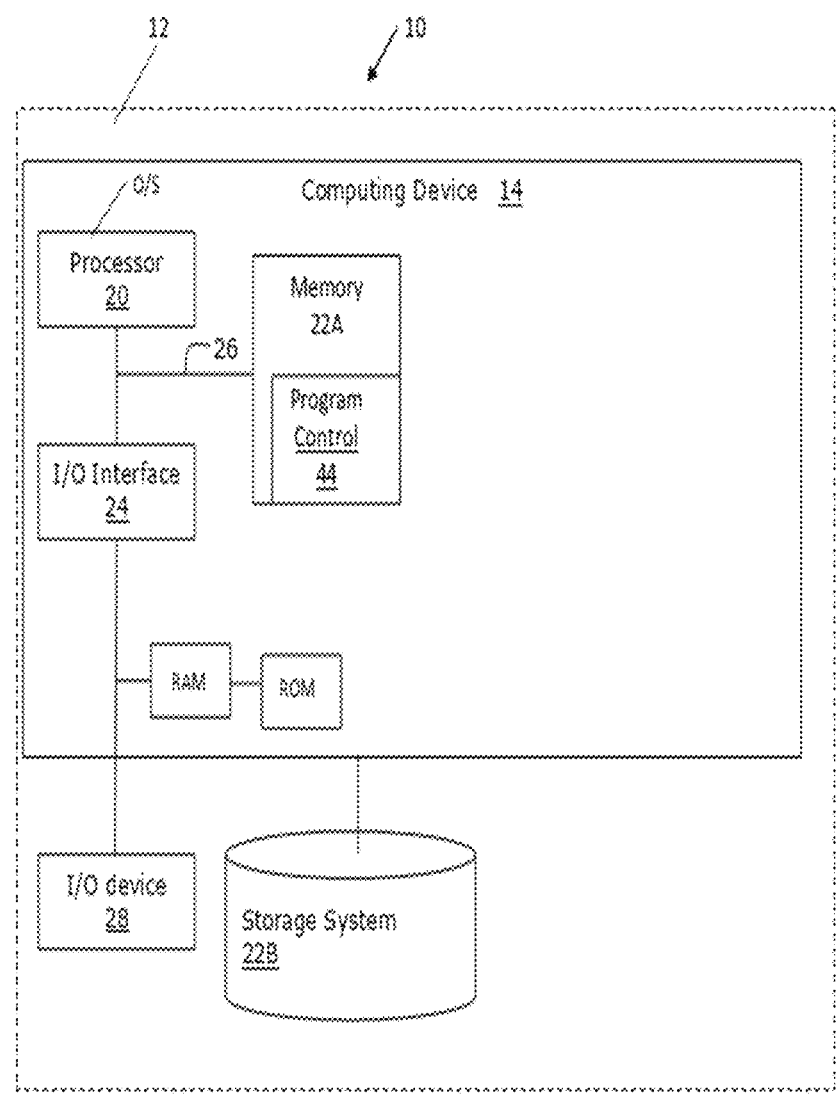
FIG. 1 is an illustrative environment for implementing the steps in accordance with aspects of the invention.

The present invention generally relates to an application for obtaining groceries or other merchandise and, more particularly, a one tap/command grocery ordering via self-driving mini marts and seamless checkout-free technology. In embodiments, the present invention allows shopping to be done for one customer at a time by implementing an autonomous grocery (or other merchandise) store, e.g., vehicle that comes to the user. Advantageously, by implementing the systems and processes described herein, the consumer obtains the convenience of on-demand delivery but with the comfort of picking out merchandise themselves and at the lowest prices, as the systems and processes (e.g., fully automated system) allow for drastic cost savings that are passed on to customers.

The systems and processes described herein may be a standalone consumer service which provides autonomous grocery or other merchandise stores; however, licensing deals with existing supermarket/grocery/convenience chains for them to white label their own self-driving minimarts is also contemplated herein. In embodiments, the systems and processes described herein are not a delivery vehicle that just delivers pre-ordered goods. It is the entire mini-mart (store) coming to the consumer at the tap of a button using, e.g., a mobile application, to request the convenience of an autonomous vehicle with merchandise stored therein. With the set up presented herein, it is now possible to provide a fleet of autonomous grocery stores, providing the end consumers the ability to pick the freshest produce or other merchandise at their doorstep or other desired location. And by leveraging automation from self-driving technologies, initially remotely piloted, it is now possible to provide the consumer convenience at the most affordable cost, at the same price or cheaper as going to the store themselves.

Accordingly, the systems and processes described herein will thus enable on-demand delivery at significant savings. The systems and processes described herein can compete against delivery drones, sidewalk robots, and self-driving delivery vehicles; with the systems and processes described herein being much larger, house a bigger selection, and offer an entire checkout-free, in-person shopping experience rather than being just a delivery vehicle.

Illustrative Computing Environment

The present invention may be a system, a method, and/or a computer program product. The computer program product may include a computer readable storage medium (or media) having computer readable program instructions thereon for causing a processor to carry out aspects of the present invention. In another aspect of the invention, the method is provided for deploying a system for performing the features herein in a computing environment. The method comprises providing a computer infrastructure being operable to perform any combination of the method steps and/or any combination of functionality of the computing environment disclosed and/or recited herein.

FIG. 1 shows an illustrative environment 10 for managing the processes in accordance with the invention. To this extent, the environment 10 includes a server 12 or other computing system that can perform the processes described herein. In particular, the server 12 includes a computing device 14. The computing device 14 can be resident on a network infrastructure or computing device of a third party service provider (any of which is generally represented in FIG. 1). The computing device 14 includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, any number of different sensors as described herein, to determine a purchase of product (merchandise) and to provide a receipt to the consider.

In general, the processor 20 executes computer program code (e.g., program control 44), which can be stored in memory 22A and/or storage system 22B. Moreover, in accordance with aspects of the invention, program control 44 controls the processes described herein. The program control 44 can be implemented as one or more program code in program control 44 stored in memory 22A as separate or combined modules. Additionally, the program control 44 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

In an aspect of the present invention, the program control 44 provides the functioning of the systems and processes described herein. For example, the program control 44 provides a novel way to make it possible to obtain groceries (or other merchandise) on command with a single tap of a button or voice command. To make this concept a reality, the program control 44 includes a novel system/functionality that combines advanced technologies: (i) self-driving vehicles/marts, (ii) checkout-free rack sensor technology, (iii) restocking depots and vehicle communication platform, (iv) real-time mapping and tracking system, and (v) on-demand summoning protocol via a mobile application (or other computer application). Combining these technologies to make the convenience store come to the consumer has created a completely new way to experience shopping as explained in more detail herein.

In an aspect of the invention, the computer program product includes a computer usable storage medium having program code embodied in the storage medium. The program code is readable/executable by the computing device 12 to implement the features described herein. The program instructions are stored on the computer readable storage medium for execution by the CPU via the computer readable memory. The computer readable program instructions may also be loaded onto the computer 12, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The computer readable program instructions described herein can be downloaded from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

It is understood that the present invention can also be implemented using cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Processes and Systems for Implementing the Present Invention

Application and Purchases

Figure 2:
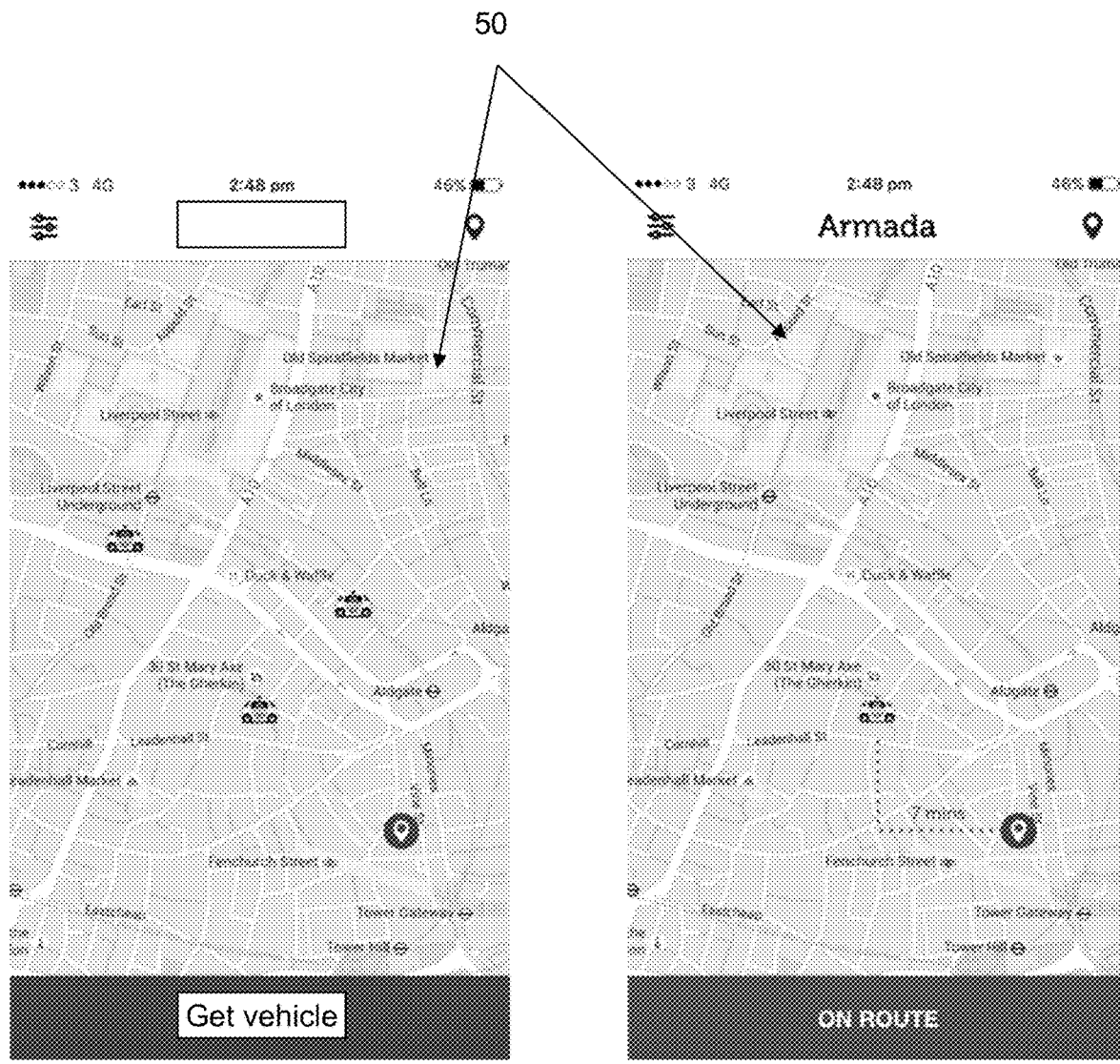
FIG. 2 shows an application, e.g., mapping system, used to track an autonomous vehicle and location of a consumer in accordance with the processes and systems of the present invention.

As shown representatively in FIG. 2, a user (consumer) can simply tap an icon/button or speak a programmed voice activated command on their app or issue a voice command to their voice assistant in order to deploy the application and its related functionality. Upon activation, the application will deploy an autonomous vehicle (ROBOMART™) from the closest store to provide the services noted herein, e.g., purchase of merchandize (grocery), at the convenience and location desired by the user. The autonomous vehicle can then be tracked on a map (e.g., customer ordering interface) 50 by the user, the store and/or any desired third party (e.g., service provider).

Figure 3:
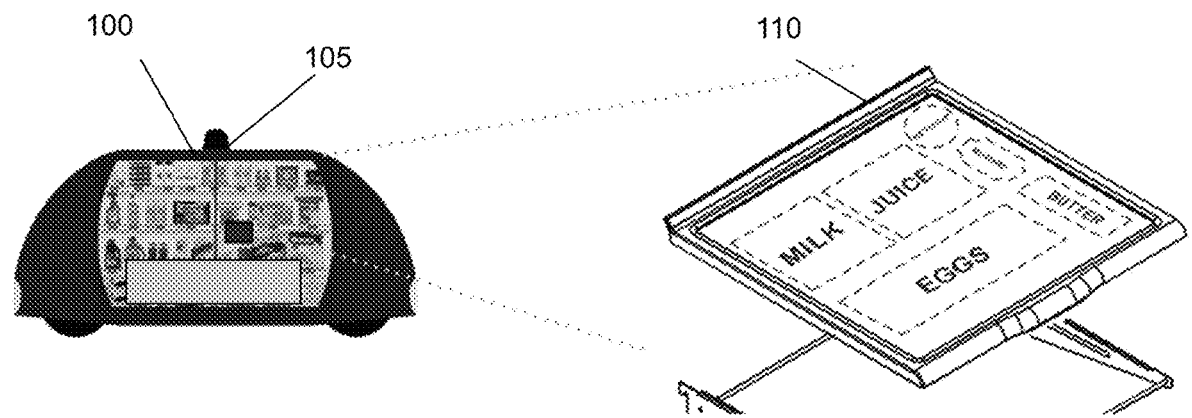
FIG. 3 shows a display used for purchasing of merchandise in accordance with aspects of the present invention.

When the autonomous vehicle arrives, the user will be notified by an alert, and all they need to do is walk up to the autonomous vehicle 100 as shown representatively in FIG. 3, open the doors (or other compartments), and take the items they need from the vehicle. The combination of sensors 105 on the vehicles (rack sensors and other sensors shown in, e.g., FIGS. 6-8) let the systems and processes described herein know which products the user has taken, which can be displayed in a real time price running total on the outside window display 110 (smart glass) as shown in FIG. 3. Additionally, the display 110 will show the customer's name and other desired purchase items as described herein. Once the user has completed the purchase, the autonomous vehicle 100 will go to the next consumer, a holding area, or for replenishment of the merchandise (shown in FIG. 9), all of which can be tracked by the mapping program (e.g., customer ordering interface) 50 shown in FIG. 2. In this way, the customers can order, pick out, pay for and receive products all with a single tap or command, in the most seamless way possible.

Figure 4:
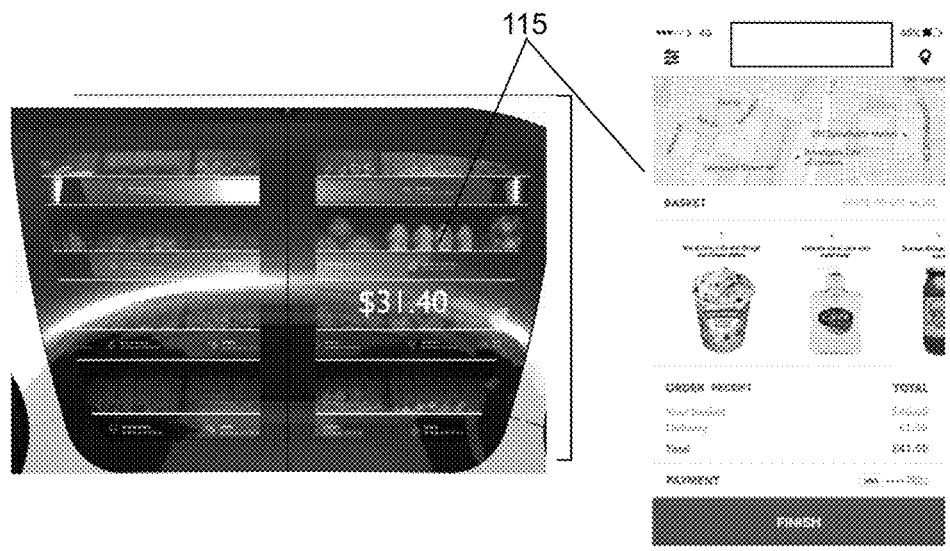
FIG. 4 shows a receipt for purchasing of merchandise in accordance with aspects of the present invention.

In embodiments, the application can show a full breakdown of the products taken from the vehicle 100 and provide a receipt of purchase as shown representatively in FIG. 4 at reference numeral 115. In embodiments, the receipt 115 can include a complete listing of the items (merchandise), their description and, in embodiments, a pictorial representation of the items, themselves. This information can also be provided on the outside window display 110 or provided automatically to the user on their mobile application. Based on the total cost, the system and processes described herein can automatically charge the cost of the purchase to a debit/credit card accordingly (which has already been saved in the systems described herein.

Vehicle Technology

The vehicle technology is referred to as ROBOMART™. The vehicle 100 is a self-driving mart or "Self-Driving Mobile Autonomous Retail Transport". As shown in FIGS. 5-8, the vehicle 100 (ROBOMART™ vehicle) is a vehicle with different levels of self-driving capabilities (i.e., fully autonomous/vehicle is completely driverless/no driver/vehicle in control/remote driving by a driver at a piloting station). In embodiments, the vehicle 100 can be franchised and enables, on a large scale, the ability to call a grocery store to the user on-demand. As described herein, the vehicle 100 is not just a delivery vehicle, instead, the vehicle 100 enables active retail, i.e., the ability to pick your own goods in person, without having to physically go to the store.

Figure 5:
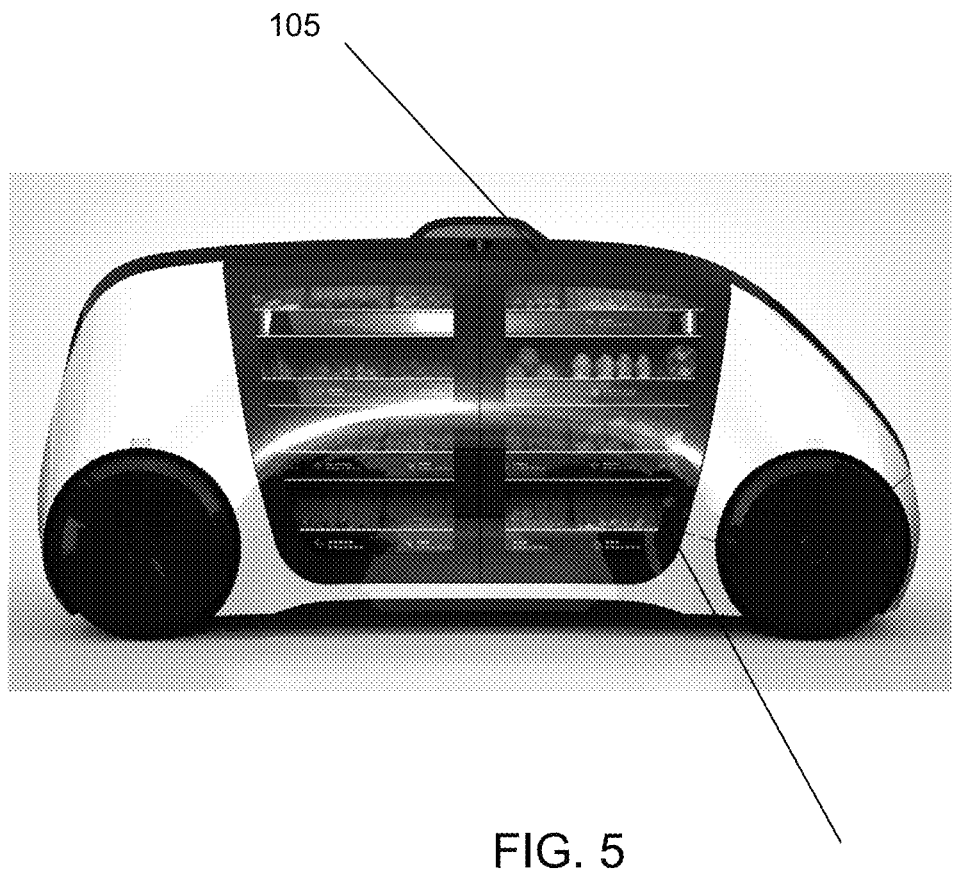
FIG. 5 shows a general overview of an autonomous vehicle used in implementing the systems and processes in accordance with aspects of the present invention.
Figure 6:
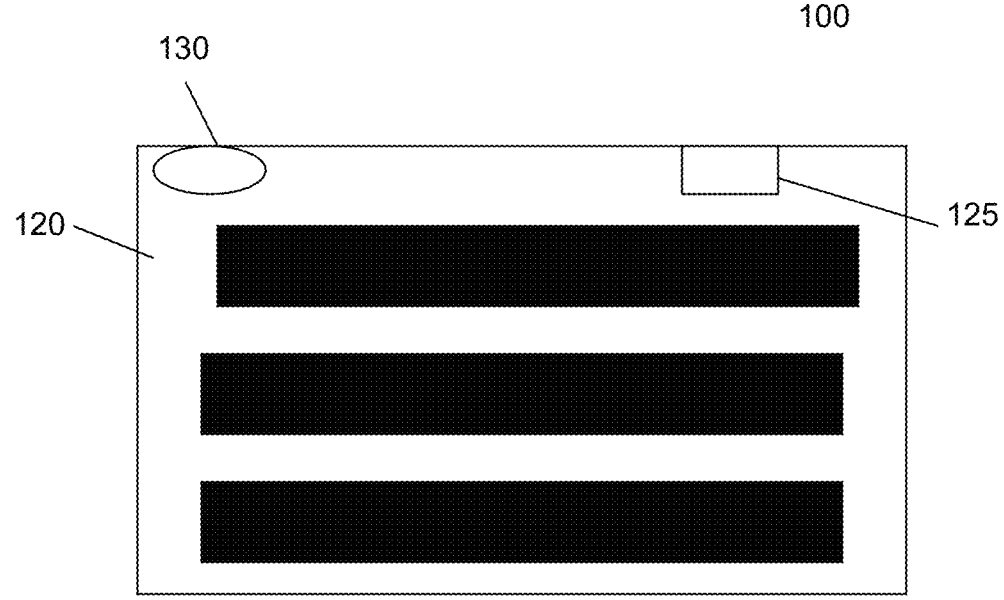
FIG. 6 shows a general rack or shelving system with sensor technology used in implementing the systems and processes in accordance with aspects of the present invention.
Figure 7:
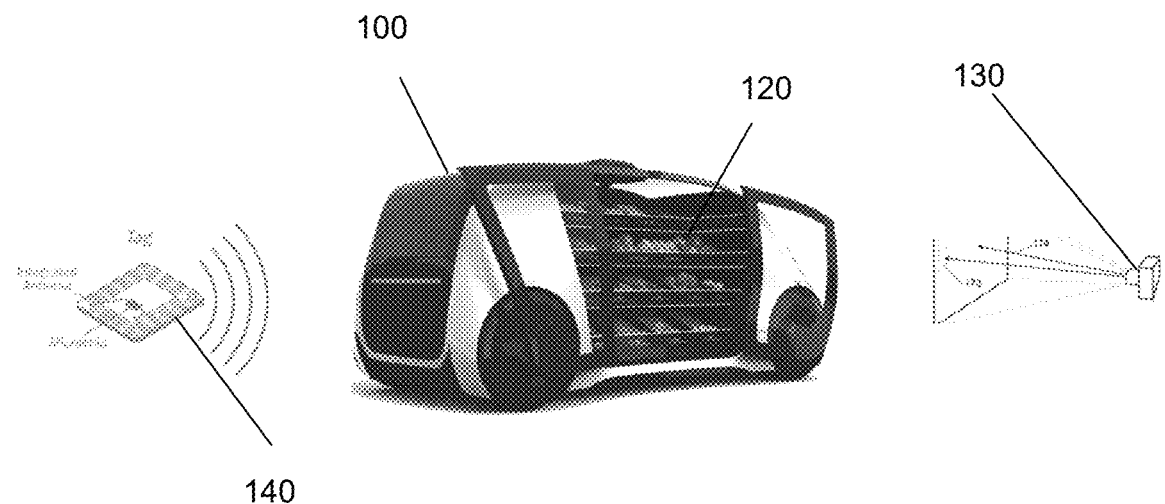
FIG. 7 shows an autonomous vehicle with sensor technologies, amongst other items, used in implementing the systems and processes in accordance with aspects of the present invention.
Figure 8:
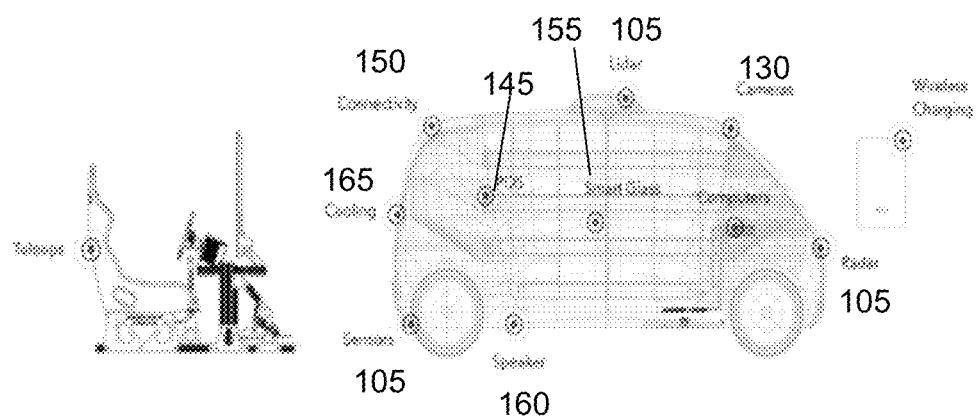
FIG. 8 shows a specific example of an autonomous vehicle with sensor technologies, amongst other items, used in implementing the systems and processes in accordance with aspects of the present invention.

The system and processes described herein is a checkout-free system that uses a combination of sensor technology in addition to computer vision (e.g., sensors as shown in FIGS. 5-7) to track what is taken out of the vehicle 100 while customers shop. In embodiments, as shown in FIGS. 7 and 8, RFID antennas 140 are used to create a gate from which it is possible to obtain get real-time information on whether a tagged product is taken out of the vehicle 100. Other sensors are also contemplated herein, e.g., radar, LIDAR, infrared, etc. Cameras 130 are also monitoring the shelves to calculate, using computer vision, the purchases and the balance of products (which products remain in the vehicle) in each shelf. As shown in FIG. 7, an RFID system 140 can be used as a back-up to the camera system or, alternatively, in combination or a primary sensor.

FIG. 8 shows a more detailed view of the autonomous vehicle 100. As shown in FIG. 8, the vehicle 100 includes several subsystems. These subsystems include sensor technologies including LIDAR, Radar, and cameras, with connectivity to a computing environment 10 such as shown in FIG. 1, as an example. In embodiments, the LIDAR, radar, sensors (motion sensors, proximity sensors, infrared, etc.) and cameras can assist in the autonomous movements of the vehicle as should be understood by those of skill in the art. In addition, the LIDAR, radar, sensors (motion sensors, proximity sensors, infrared, RFID etc.) (as shown at reference numeral 105) and cameras 130 can be used in tracking of the purchase of products by a user, e.g., sense which products have been removed from the vehicle for purchase.

In embodiments, the purchase will be automatically deducted from a saved debit/credit card of the user using, e.g., POS (point of sale) system 145. For example, at the point of sale, the POS 145 calculates the amount owed by the customer, indicates that amount, may prepare an invoice for the customer (which may be a cash register printout or email or text), and indicates the options for the customer to make payment. It is also the point at which a customer makes a payment to the merchant in exchange for the goods (merchandise). After receiving payment, the merchant may issue a receipt for the transaction, which is usually printed but is increasingly being dispensed with or sent electronically. In embodiments, there needs to be no swiping of credit/debit card etc. Instead, it is contemplated that RFID and vision is used to track what is taken out of the mobile store, and uses a timestamp when the doors are open and closed to know the "shopping engagement". Based on the amount "purchased" during the shopping engagement by the customer, a charge will be provided to their saved card details on the app, using Stripe on the backend to process the payment.

The autonomous vehicle 100 further includes connectivity, e.g., modems, etc., to receive/transmit pertinent information, e.g., purchases, products needed to be replenished, location of user and vehicle, etc. The autonomous vehicle 100 further includes smart glass 155 (window display) so that the consumer can see the merchandise being purchased by the autonomous vehicle 100. The smart glass 155 can also provide merchandise and purchase information, amongst other features. The autonomous vehicle 100 further includes a speaker 160 for communication with the consumer (user) and a cooling system 165 to ensure that produce remains fresh.

Figure 9:
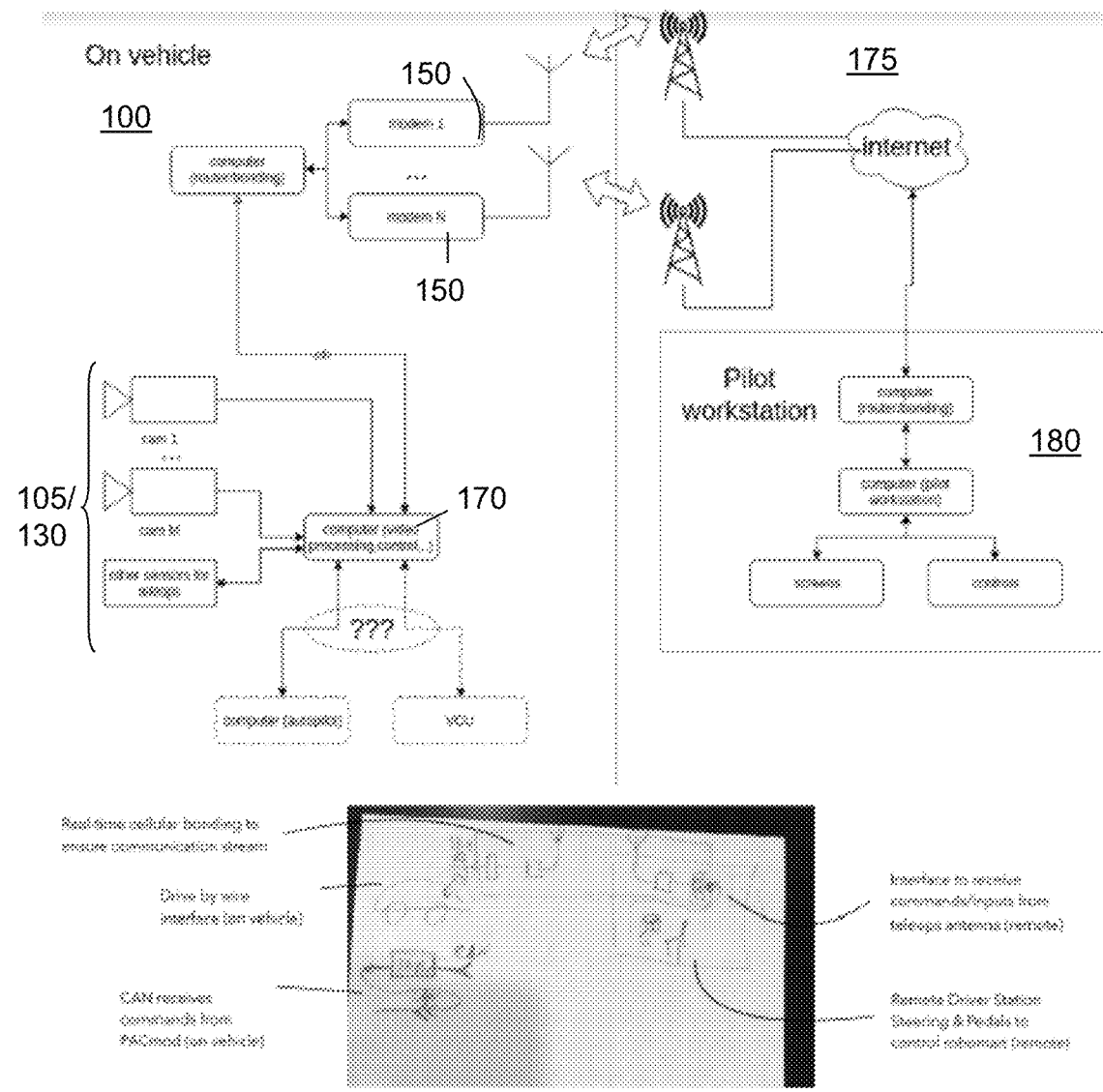
FIG. 9 shows a schematic architecture of the processes and systems of the present invention.

FIG. 9 shows a schematic architecture of the processes and systems of the present invention. As shown representatively in FIG. 9, the vehicle 100 includes any number of modems or other connectivity devices 150 connected to the computing system 10. The computing system 10 is connected to a computer video processing control 170 (e.g., by Ethernet or other communications as described with respect to FIG. 1). The computer video processing control 170 is also connected to different cameras 130 and other sensors 105 described herein. In embodiments, the cameras 130 and other sensors 105 can assist in the autonomous movement of the vehicle 100, as well as determine which product (merchandise) have been purchased by the consumer (e.g., by visual tracking, scales on the racks of the vehicle that hold the items to be purchased, radar, etc.). In embodiments, information can be passed between the vehicle 100 and a pilot workstation 180 via the internet 175 or other remote communication mechanisms as described herein (see, e.g., FIG. 1), as an example. In embodiments, the systems and processes can be cloud based systems as described above and represented also by reference numeral 175.

In embodiments, the vehicle 100 can be an autonomous vehicle or driven via teleoperations. The interface includes a drive by wire interface with a CAN receiver receiving commands from a PACmod drive by wiring system (on the vehicle). The interface can receive commands to and from the vehicle by a teleops antenna system (as shown representatively at reference numeral 175). The commands can come from a remote piloting workstation 180 (e.g., remote driver station) which includes steering and other controls of the vehicle. In this way, the vehicle can be autonomous, e.g., without a driver on board. With this set up it is now possible to provide a fleet of autonomous grocery stores, providing the end consumers the ability to pick the freshest produce right at their doorstep. And by leveraging automation from self-driving tech, initially remotely piloted, it is now possible to give the consumer convenience at the most affordable cost, at the same price or cheaper as going to the store themselves.

Seamless Checkout-Free Technology

The processes and systems described herein include a 'seamless' checkout-free sensor technology which will be retrofitted into the vehicles 100 along with built vehicle racks 120 shown in FIG. 6. This checkout-free sensor technology (105/130), i.e., called 'seamless', will be what enables a single tap experience to getting groceries or other merchandise. For example, the racks 120 utilize sensors 125 (e.g., RFID, infrared, radar, cameras or other known sensors) that track whether a product is in the rack or not based on its tag, weight and size configuration. If a product is removed from the rack, this informs the system that the product has been taken to be purchased and the running total display is adjusted accordingly. The systems and processes also rely on a number of visual cues from cameras 130 embedded into the racks (where merchandise is placed) to track and optimize the process and resolve disputes with the system in case errors arise.

Further, as described above, the RFID and vision is used to track what is taken out of the mobile store, and uses a timestamp when the doors are open and closed to know the "shopping engagement". Based on the amount "purchased" during the shopping engagement by the customer, a charge will be provided to their saved card details on the app, using Stripe on the backend to process the payment.

Restocking Depots & Vehicle Communication Technology

Figure 10:
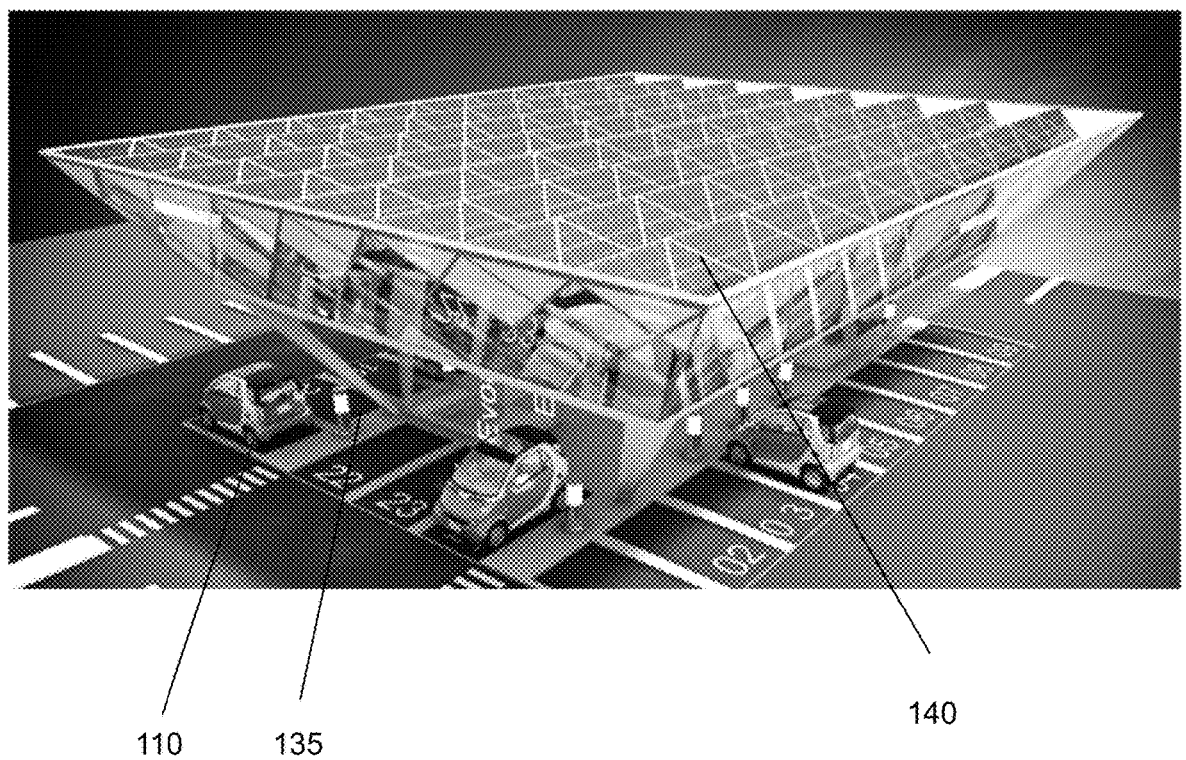
FIG. 10 shows a schematic diagram of a replenishment center.

Once stock levels drop below a defined threshold, the autonomous vehicle 100 will communicate with and talk to its closest restocking depot 135 as shown in FIG. 10 (e.g., depot for recharging and outfitting products). The autonomous vehicle 100 or other vehicle can then head to the appropriate (closest) restocking depot 135 to restock and recharge its products, and the drop point 135 will already be prepared for the restocking, as it is communicating with the autonomous vehicle 100. In embodiments, restocking depot 135 will essentially be a hybrid between a charging station powered by solar panels 140 for electric vehicles (e.g., autonomous vehicle 100 vehicles) and a central warehouse for products and goods. In embodiments, during off peak times any excess capacity can be rented or subleased.

Real-Time Mapping & Tracking Technology

The systems and processes described herein also include a novel method to track not only the location of our autonomous vehicle 100 in real time, but also the stock levels for each product in the rack 110. Specifically, the systems and processes described herein information to display a tracking map for customers (see, e.g., FIG. 2) to see when their autonomous vehicle 100 will arrive, and to inform the network (e.g., computing environment of FIG. 1) and drop point 135 about stock levels at all times for the whole fleet. Accordingly, the computing environment of FIG. 1 can act as a centralized management system in communication with any combination of other systems described herein, in order to track and maintain purchases and/or inventory, etc. This technology is what enables the business to operate in a highly optimized manner with an extremely efficient throughput, and allow us to pass on these cost savings to customers in the form of lower price.

On-Demand Summoning Protocol Technology

In embodiments, the systems and processes described herein allow all these systems to come together and work seamlessly for customers. The systems and processes described allows a user to order an on-demand purchase, with a single tap or voice command, and shop for their items as they would in a physical store, but without having to checkout. The systems and processes described herein allow the user with the convenience of on-demand delivery but with the comfort of picking out products themselves and the best part is they get all this at the lowest prices as our fully automated system allows for drastic cost savings that can be passed onto customers.

Flow Diagrams

Figure 11:
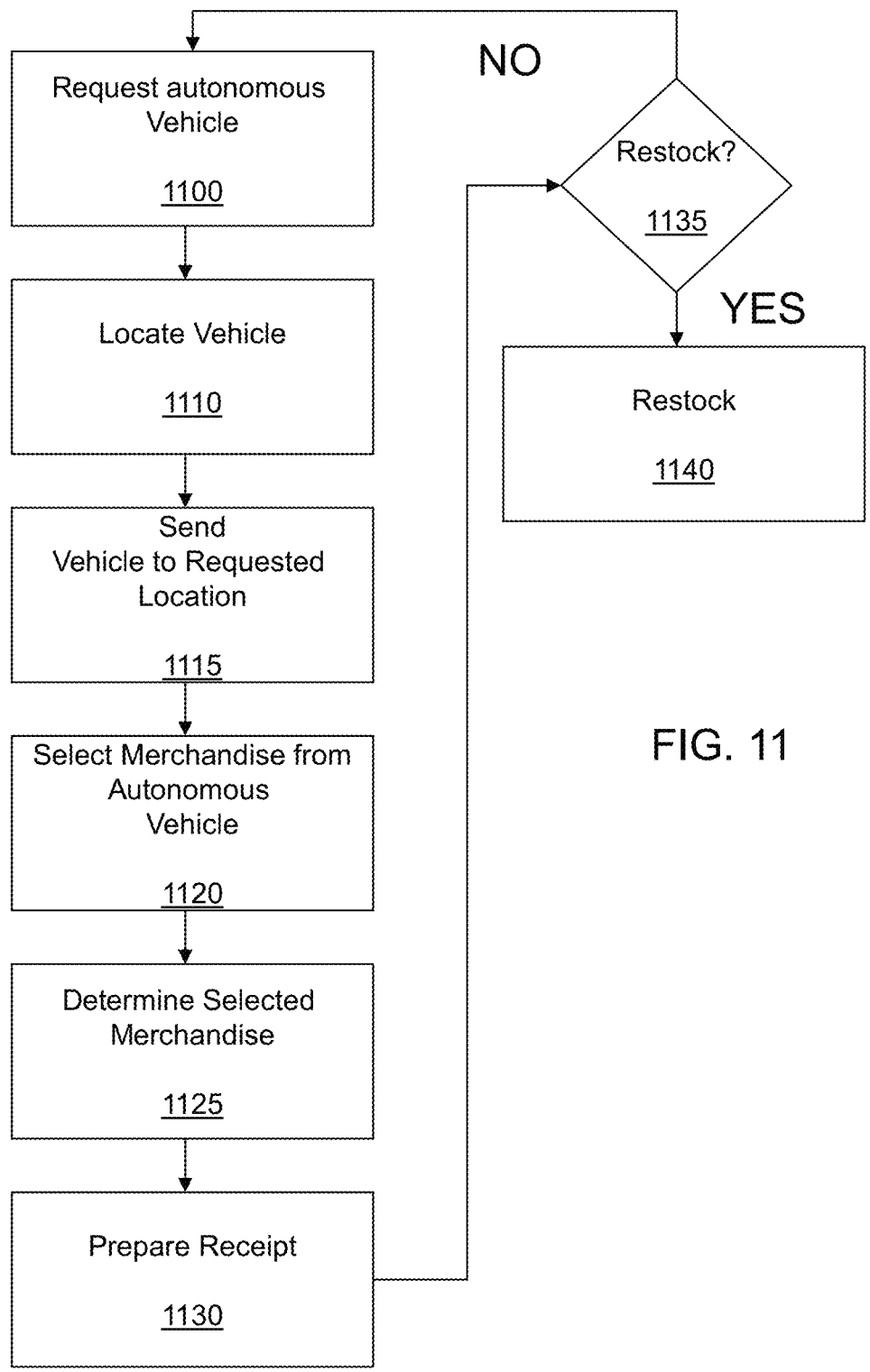
FIG. 11 shows an exemplary flow of processes in accordance with aspects of the invention.

FIG. 11 show exemplary flows for performing aspects of the present invention. The steps of FIGS. 11 and 12 may be implemented in the environment of FIG. 1, for example. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 11, at step 1100, the consumer will request the autonomous vehicle 100 to be deployed to the consumer. At step 1110, the systems and processes will determine the nearest autonomous vehicle 100 to the consumer. At step 1115, the systems and processes will deploy the nearest autonomous vehicle 100 to the consumer. In embodiments, the systems and processes will have a degree of artificial intelligence, which can determine from past purchases, what purchases the consumer may desired in this new transaction. The systems and processes can then ensure to a fair degree of accuracy that a vehicle being deployed to the consumer will have the items which may be requested by the consumer. At step 1120, the consumer will select certain items from the autonomous vehicle. At step 1125, the systems and processes will determine the items purchased, e.g., using any combination of the sensors described herein, and at step 1130 will prepare a receipt of such purchased items. The receipt can be provided to the consumer via paper or by any known electronic means.

After the purchase, at step 1135, the systems and processes will determine whether the vehicle needs to be restocked. Again, this may be determined by onboard sensors or other mechanisms which know which items need to be replaced in the vehicle. If restocking is necessary, the systems and processes will direct the vehicle to a drop location for restocking. If no restocking is needed, the systems and processes described herein will wait for a next request at step 1100. At scale, the consumer is done with shopping in minutes. Compared to on-demand delivery, shopping can take an hour or more.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Figure 12:
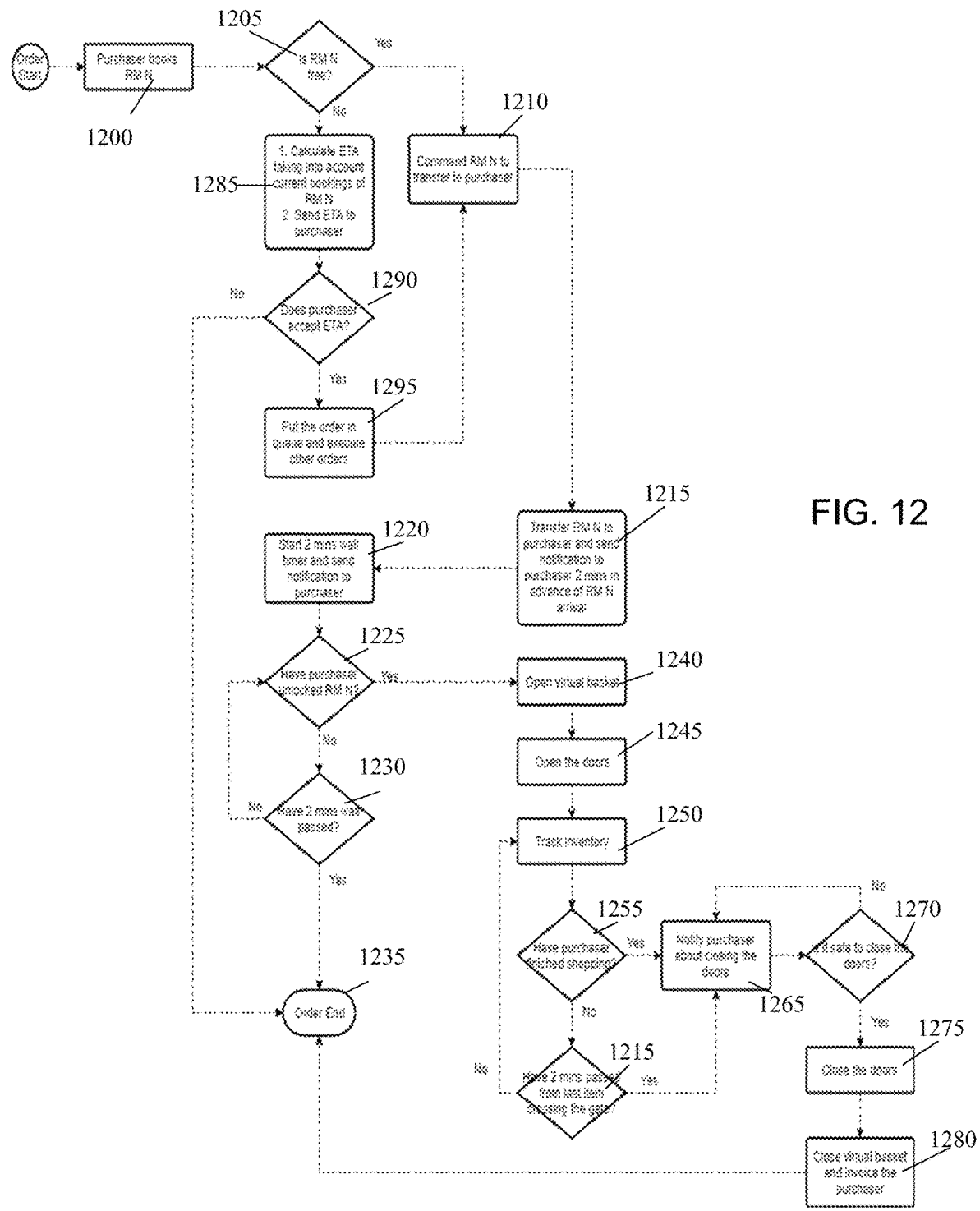
FIG. 12 shows another exemplary flow of processes in accordance with aspects of the invention.

Referring now to FIG. 12, at step 1200, the purchaser (customer) requests the mini store (autonomous vehicle). At step 1205, a determination is made as to whether the mini store (autonomous vehicle) is available. If yes, at step 1210, the mini store (autonomous vehicle) is routed to the customer. At step 1215, the mini store (autonomous vehicle) is transferred to the customer, and a notification is sent to the customer. The notification can be provided at a predetermined time, prior to arrival. At step 1220, a timer starts and a new notification is sent to the customer. This timer can begin at arrival time to the customer's location. At step 1225, a determination is made as to whether the customer has unlocked (opened) the mini store (autonomous vehicle) for access to the merchandise. If a predetermined amount of time has passed, at step 1230, the order will end at step 1235; otherwise, the processes will revert back to step 1225.

At step 1225, if it is determined that the customer has unlocked or otherwise gained entry to the merchandise on the mini store (autonomous vehicle), the processes will continue at step 1240. At step 1240, the processes will open a virtual basket. At step 1245, the doors of the mini store (autonomous vehicle) will open. At step 1250, the processes will track the inventory. At step 1255, a determination will be made as to whether the customer has stopped shopping. If not, the processes will revert back to step 1250.

If it is determined that the customer has stopped shopping at step 1255, the processes will continue to step 1265. At step 1265, the processes will notify the customer that the doors will be closing. This notification can be provided on a display or the smart glass, itself. At step 1270, a determination will be made as to whether it is safe to close the door. This determination can be made with any of the sensors on the mini store (autonomous vehicle), for example. For example, a camera can determine that the customer is a safe distance from the door. At the time it is determined that the customer is safely away from the door, at step 1275 the door can be closed. At step 1280, the virtual basket will be closed and an invoice will be generated for the customer. The process will then end at step 1235.

Reverting back to step 1205, if it is determined that the mini store (autonomous vehicle) is not free, the processes will continue at step 1285. At step 1285, the processes will calculate an estimated time of arrival (ETA) taking into account the current bookings of the mini store (autonomous vehicle) or fleet of mini stores (autonomous vehicles). The processes will then send an ETA to the customer. At step 1290, a determination is made as to whether the customer accepts the ETA. If yes, the order is placed into the queue and executed with any other orders, at step 1295. The processes will then continue to step 1210. If the customer does not accept the ETA, the processes will continue to step 1235, where the order will end.

Additional Information

Figure 13:
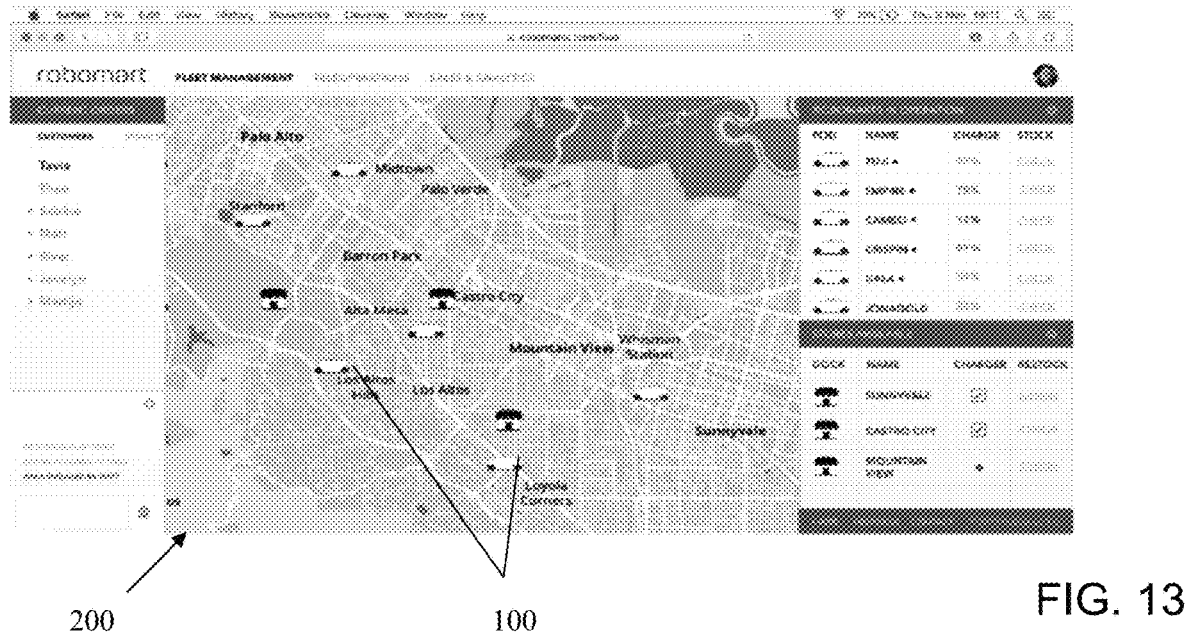
FIG. 13 shows a screen shot representing fleet management system for the autonomous vehicles in accordance with aspects of the present invention.
Figure 14:
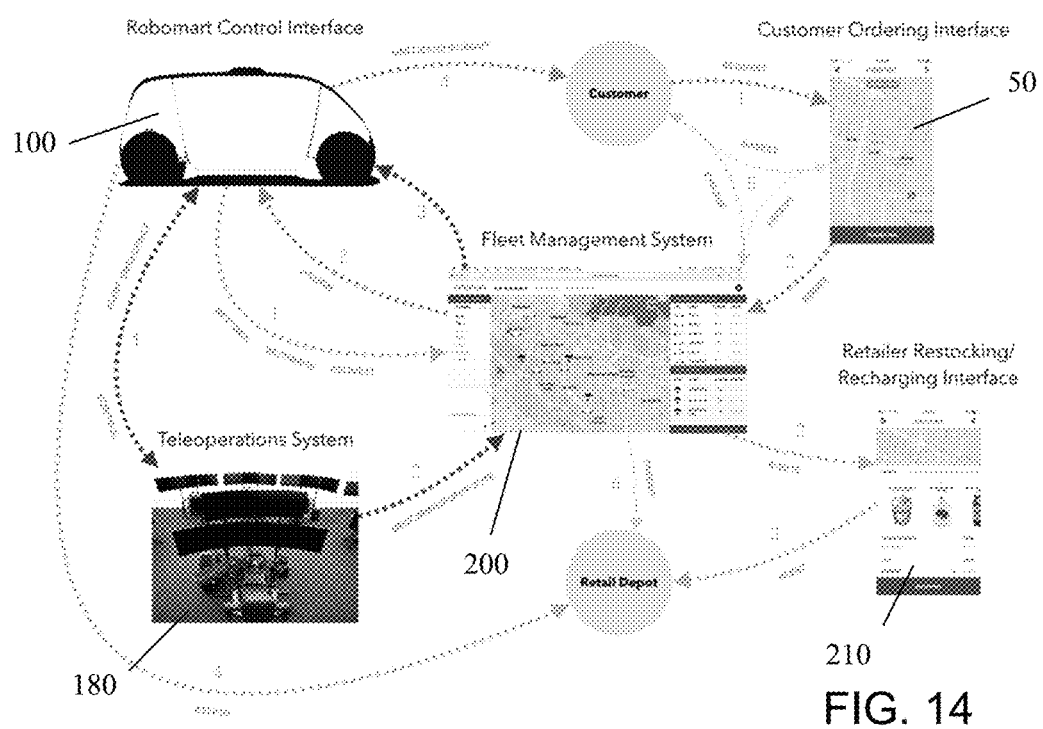
FIG. 14 shows a pictorial representation of interactions between the different systems in accordance with aspects of the present invention.

FIG. 13 shows a screen shot representing fleet management system for the autonomous vehicles in accordance with aspects of the present invention. As shown in FIG. 13, for example, the systems and processes described herein can keep track of the autonomous vehicles within certain geographic locations. This provides the ability to better manage the fleet of vehicles, knowing where each of the vehicles are at any particular time, whether at a customer, at the replenishment depot or in transit, etc. FIG. 14 shows a pictorial representation of interactions between the different systems in accordance with aspects of the present invention. By way of example, FIG. 14 shows the interactions between the autonomous vehicle 100, the piloting system 180, the fleet management system 200, the customer ordering interface (e.g., map) 50 and the retailer restocking/recharging interface 210. In embodiments, the retailer restocking/recharging interface 210 provides the retailer with inventory information for restocking purposes. For example, the retailer restocking/recharging interface 210 maintains track of the inventory on the autonomous vehicle 100, e.g., determines which items have been removed by the customer and would need replenishment.

From the perspective of the autonomous vehicle 100:

(i) the fleet management system 200 can assign the autonomous vehicle 100 a particular route or customer location;

(ii) the fleet management system 200 can assign the autonomous vehicle 100 to restock itself at the replenishment center;

(iii) the teleoperations system (e.g., piloting system 180) can provide commands to the autonomous vehicle 100 for driving to any particular location, e.g., customer, replenishment center, etc.; and (iv) the autonomous vehicle 100 can unlock itself when it arrives at the customer.

From the perspective of the teleoperations system (e.g., piloting system 180):

(i) the teleoperations system (e.g., piloting system 180) can provide commands to the autonomous vehicle 100 for driving to any particular location, e.g., customer, replenishment center, etc.; and (ii) the teleoperations system (e.g., piloting system 180) can receive commands from the fleet management system 200.

From the perspective of the customer ordering interface 50:

(i) the customer can request arrival of the autonomous vehicle 100 from the fleet management system 200 for purchase of merchandise, at which time the management system 200 will determine the location of the customer and route an autonomous vehicle to the location of the customer; and (ii) the customer will be provided a receipt for the purchase of the merchandise.

From the perspective of the fleet management system 200:

(i) the fleet management system 200 can assign the autonomous vehicle 100 a particular route or customer location;

(ii) the fleet management system 200 can assign the autonomous vehicle 100 to restock itself at the replenishment center;

(iii) the fleet management system 200 will receive location information and a request from the customer, at which time the management system 200 will route an autonomous vehicle to the location of the customer;

(iv) the fleet management system 200 will calculate a charge for the purchase of the merchandise and provide a receipt for the purchase of the merchandise to the customer; and (v) the fleet management system 200 will provide a payment to the retail depot and/or replenishment system.

From the perspective of the retail restocking/recharging interface 210:

(i) the retail restocking/recharging interface 210 will receive routing information from the management system 200: and (ii) the retail restocking/recharging interface 210 will provide an alert to the retail store and/or the replenishment center that a vehicle is being routed thereto.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a CPU, a computer readable memory and a computer readable storage medium, the computer readable storage storing a set of program instructions for execution by the CPU via the computer readable memory, the set of program instructions comprising:
        program instructions to determine a location of a user;
        program instructions to determine a nearest autonomous or teleoperated vehicle, from a plurality of vehicles, to the location of the user based at least in part on an estimated time of arrival at the location of the user;
        program instructions to deploy said vehicle to the location of the user;
        wherein said vehicle contains a plurality of items of merchandise, each item of the plurality of items is available for the user to take from the plurality of items of merchandise;
        program instructions to determine which merchandise from the plurality of items of merchandise has been taken from said vehicle by the user by detecting one or more items of the merchandise that are taken from the plurality of items placed in the vehicle;
        program instructions to calculate a cost for the merchandise taken from said vehicle by the user; and
        program instructions to provide a receipt to the user for the merchandise taken from said vehicle by the user.

2. The system of claim 1, wherein the set of program instructions further comprises:
    program instructions, in response to receiving a single user request to a computing device linked to the user, to assign and deploy said vehicle to the location of the user; and
    program instructions, in response to receiving the single user request to the computing device linked to the user, to track, using one or more sensors, whether an item of the plurality of items of merchandise has been taken from said vehicle by the user.

3. The system of claim 1, wherein the set of program instructions further comprises:
    program instructions, in response to receiving a single user request to a computing device linked to the user, to assign and deploy said vehicle to the location of the user;
    program instructions, in response to receiving the single user request to the computing device linked to the user, to perform one or more of following steps:
        to unlock a compartment of said vehicle with the plurality of items of merchandise, or
        to open a compartment of said vehicle with the plurality of items of merchandise.

4. The system of claim 1, wherein the set of program instructions further comprises:
    program instructions, in response to receiving a single user request to a computing device linked to the user, to assign and deploy said vehicle to the location of the user; and
    program instructions, in response to receiving the single user request to the computing device linked to the user, to send one or more notification to the computing device linked to the user about arrival of the vehicle to the location of the user.

5. The system of claim 1, wherein the set of program instructions further comprises:
    program instructions, in response to receiving a first user request to a computing device linked to the user, to assign and deploy said vehicle to the location of the user,
    program instructions to receive a second user request to unlock or open a compartment of said vehicle with the plurality of items of merchandise,
    program instructions, in response to receiving the second user request, to perform one or more of the following steps:
        to unlock the compartment with plurality of items of merchandise, or
        to open the compartment with plurality of items of merchandise.

6. The system of claim 1, wherein the set of program instructions further comprises:
    program instructions to determine that the user has finished taking the merchandise from said vehicle;
    program instructions, after determining that the user has finished taking the merchandise from said vehicle, to close a compartment of said vehicle that used to contain the merchandise.

7. The system of claim 1,
    wherein said vehicle comprises one or more sensors including: a camera, an RFID sensor, an infrared sensor, a weight sensor, a motion sensor, a proximity sensor, a lidar, or a radar; and
    wherein the set of program instructions further comprises program instructions to track, using the one or more sensors, whether an item of the plurality of items of merchandise has been taken from said vehicle by the user.

8. The system of claim 1,
    wherein said vehicle comprises a plurality of sensors that includes one or more of: a camera, an RFID sensor, an infrared sensor, a weight sensor, a motion sensor, a proximity sensor, a lidar, or a radar; and
    wherein the set of program instructions further comprises program instructions to track whether an item of the plurality of items of merchandise has been taken from said vehicle by the user using a combination of different type of sensors from the plurality of sensors based at least in part on an image, detected tag, weight, or size of the item.

9. The system of claim 1,
    wherein said vehicle comprises a plurality of sensors that includes an RFID sensor; and wherein the set of program instructions further comprises program instructions to determine whether an item is a part of the one or more items of the plurality of items of merchandise based at least in part on determining whether the item has been left in said vehicle by the user based at least in part on detecting an RFID tag of the item within said vehicle.

10. The system of claim 1,
wherein said vehicle comprises a plurality of sensors that includes one or more of: a camera, an RFID sensor, an infrared sensor, a weight sensor, a touch sensor, a lidar, or a radar; and
wherein the set of program instructions further comprises:
program instructions to detect, by a first sensor of the plurality of sensors, a removal of a first item from the plurality of items placed in said vehicle,
program instructions to detect, by a second sensor of the plurality of sensors, a removal of a second item from the plurality of items placed in said vehicle, and
program instructions to determine that the removed first item and the removed second item are the same item of the plurality of items of merchandise.

11. The system of claim 1,
wherein said vehicle comprises a plurality of sensors that includes one or more of: a camera, an RFID sensor, an infrared sensor, a weight sensor, a touch sensor, a lidar, or a radar; and
wherein the set of program instructions further comprises:
program instructions to detect, by a first sensor, of the plurality of sensors, a removal of a first item from the plurality of items placed in said vehicle,
program instructions to detect, by a second sensor of the plurality of sensors, a removal of a second item, different from the first item, from the plurality of items placed in said vehicle, and
program instructions to determine that the removed first item and the removed second item are the same item of the plurality of items of merchandise despite detecting, by the second sensor of the plurality of sensors, the removal of the second item, different from the first item, from said vehicle.

12. The system of claim 1,
wherein said vehicle comprises a plurality of sensors that includes one or more of: a camera, an RFID sensor, an infrared sensor, a weight sensor, a touch sensor, a lidar, or a radar; and
wherein the set of program instructions further comprises:
program instructions to detect, by a first sensor, of the plurality of sensors, a removal of a first item from the plurality of items placed in said vehicle,
program instructions to detect, by a second sensor of the plurality of sensors, no removal of the first item from the plurality of items placed in said vehicle, and
program instructions to determine, based on the first sensor being the camera, that the first item of the plurality of items of merchandise was removed from said vehicle despite detecting, by the second sensor of the plurality of sensors, no removal of the first item from the plurality of items placed in said vehicle.

13. The system of claim 1,
wherein said vehicle comprises a plurality of sensors that includes one or more of: a camera, an RFID sensor, an infrared sensor, a weight sensor, a touch sensor, a lidar, or a radar; and
wherein a first sensor of the plurality of sensors is the camera;
wherein said vehicle comprises one or more racks on which the plurality of items of merchandise is placed and which has embedded one or more visual cues for the camera;
wherein the set of program instructions further comprises:
program instructions to detect, by the first sensor of the plurality of sensors, a removal of a first item from the plurality of items placed in said vehicle,
program instructions to detect, by a second sensor of the plurality of sensors, no removal of the first item from the plurality of items placed in said vehicle or a removal of a second item, different from the first item, from the plurality of items, and
program instructions to determine, based on the first sensor being the camera and the camera relying on the one or more visual cues of the one or more racks, that the first item and not the second item of the plurality of items of merchandise was removed from said vehicle despite:
detecting, by the second sensor of the plurality of sensors, no removal of the first item from the plurality of items placed in said vehicle, or
detecting, by the second sensor of the plurality of sensors, the removal of the second item, different from the first item, from the plurality of items placed in said vehicle.

14. The system of claim 1,
wherein said vehicle comprises a plurality of sensors that includes one or more of: a camera, an RFID sensor, an infrared sensor, a weight sensor, a touch sensor, a lidar, or a radar, to track whether an item of the plurality of items of merchandise has been taken from said vehicle by the user;
wherein at least one of the plurality of sensors is also used to assist said vehicle in autonomous or teleoperated movement to deploy said vehicle to the location of the user.

15. A computer-implemented method comprising:
determining a location of a user;
determining a nearest autonomous or teleoperated vehicle, from a plurality of vehicles, to the location of the user based at least in part on an estimated time of arrival at the location of the user;
deploying said vehicle to the location of the user;
wherein said vehicle contains a plurality of items of merchandise, each item of the plurality of items is available for the user to take from the plurality of items of merchandise;
determining which merchandise from the plurality of items of merchandise has been taken from said vehicle by the user by detecting one or more items of the merchandise that are taken from the plurality of items placed in the vehicle;
calculating a cost for the merchandise taken from said vehicle by the user; and
providing a receipt to the user for the merchandise taken from said vehicle by the user.

16. The method of claim 15, further comprising:
in response to receiving a single user request to a computing device linked to the user, assigning and deploying said vehicle to the location of the user; and
in response to receiving the single user request to the computing device linked to the user, tracking, using one or more sensors, whether an item of the plurality of items of merchandise has been taken from said vehicle by the user.

17. The method of claim 15, further comprising:
in response to receiving a single user request to a computing device linked to the user, assigning and deploying the nearest vehicle to the location of the user;
in response to receiving the single user request to the computing device linked to the user, performing one or more of the following steps:
unlocking a compartment of the nearest vehicle with the plurality of items of merchandise, or
opening a compartment of the nearest vehicle with the plurality of items of merchandise.

18. The method of claim 15, wherein said vehicle comprises one or more sensors including: a camera, an RFID sensor, an infrared sensor, a weight sensor, a motion sensor, a proximity sensor, a lidar, or a radar; and the method further comprising:
tracking, using the one or more sensors, whether an item of the plurality of items of merchandise has been taken from said vehicle by the user.

19. The method of claim 15, wherein said vehicle comprises a plurality of sensors that includes one or more of: a camera, an RFID sensor, an infrared sensor, a weight sensor, a motion sensor, a proximity sensor, a lidar, or a radar; and the method further comprising:
tracking whether an item of the plurality of items of merchandise has been taken from said vehicle by the user using a combination of different type of sensors from the plurality of sensors based at least in part on an image, detected tag, weight, or size of the item.

20. The method of claim 15, wherein said vehicle comprises a plurality of sensors that includes one or more of: a camera, an RFID sensor, an infrared sensor, a weight sensor, a touch sensor, a lidar, or a radar, and the method further comprising:
detecting, by a first sensor of the plurality of sensors, a removal of a first item from the plurality of items placed in said vehicle,
detecting, by a second sensor of the plurality of sensors, a removal of a second item from the plurality of items placed in said vehicle; and
determining that the removed first item and the removed second item are the same item of the plurality of items of merchandise.

* * * * *